UNITED STATES PATENT OFFICE.

HARRY F. FRENCH AND RAYMOND C. BENNER, OF FREMONT, OHIO, ASSIGNORS, BY MESNE ASSIGNMENTS, TO NATIONAL CARBON COMPANY, INC., A CORPORATION OF NEW YORK.

ELECTRIC BATTERY.

1,285,054.

Specification of Letters Patent.

Patented Nov. 19, 1918.

No Drawing.

Application filed June 6, 1916. Serial No. 101,923.

*To all whom it may concern:*

Be it known that we, HARRY F. FRENCH and RAYMOND C. BENNER, citizens of the United States, residing at Fremont, in the county of Sandusky and State of Ohio, have invented a certain new and useful Improvement in Electric Batteries, of which the following is a full, clear, and exact description.

This invention relates to electric batteries with alkaline electrolyte, particularly that type employing copper oxid and zinc as the electrodes.

It is common knowledge with those familiar with the practical operation of alkaline cells of the above type, that sodium zincate and other crystals are formed on the zinc electrode, which clog the action of the cell and cause premature deterioration. Any provision for ridding the cell of the crystal formation will result in a slower rise in the internal resistance toward the end of the life of the cell, and an increased maximum service capacity in proportion to the size of cell.

We have found that the above mentioned deposit is soluble in an ammoniacal-caustic-soda solution which can be plainly seen by passing dry ammonia gas through the exhausted electrolyte containing the crystals.

In order to retard the formation of crystals and increase the life of the cell we propose to add ammonium hydroxid solution to the sodium or potassium hydroxid electrolyte of the cell. The proportion between the two materials can be varied, but we have secured good results by the following process:

Caustic soda solution of approximately double strength, namely about 1.45 sp. gr. at ordinary temperature, is poured into the cell jar to half the usual height, and the usual layer of mineral oil poured on top to prevent evaporation and contamination by carbon dioxid of the air. A funnel is then placed in the jar with the stem extending below the oil layer, and concentrated ammonium hydroxid, about .90 sp. gr. is slowly poured in until the usual height of solution is obtained. It will be apparent by this process that substantially the usual strength of sodium hydroxid is maintained, as a given quantity of double strength has been diluted by an equal quantity of solution.

Tests of these cells on a one ampere continuous drain down to .5 volt, show an increase in service life of from 10% to 15%, or an increase in watt-hours of about $12\frac{1}{2}\%$. The formation of crystals on the zinc electrode is also lessened, which is doubtless the cause of the increase in life.

Having described our invention, what we claim is:—

1. In electric batteries, a zinc electrode, and an electrolyte consisting of the hydroxids of ammonium and an alkaline metal.

2. In electric batteries, a zinc electrode and an electrolyte containing the hydroxids of sodium and ammonium.

In testimony whereof, we hereunto affix our signatures.

HARRY F. FRENCH.
RAYMOND C. BENNER.